June 14, 1938. A. J. MEYER 2,120,290
ADJUSTABLE CONBUSTION CHAMBER ENGINE
Filed April 21, 1937 2 Sheets-Sheet 1
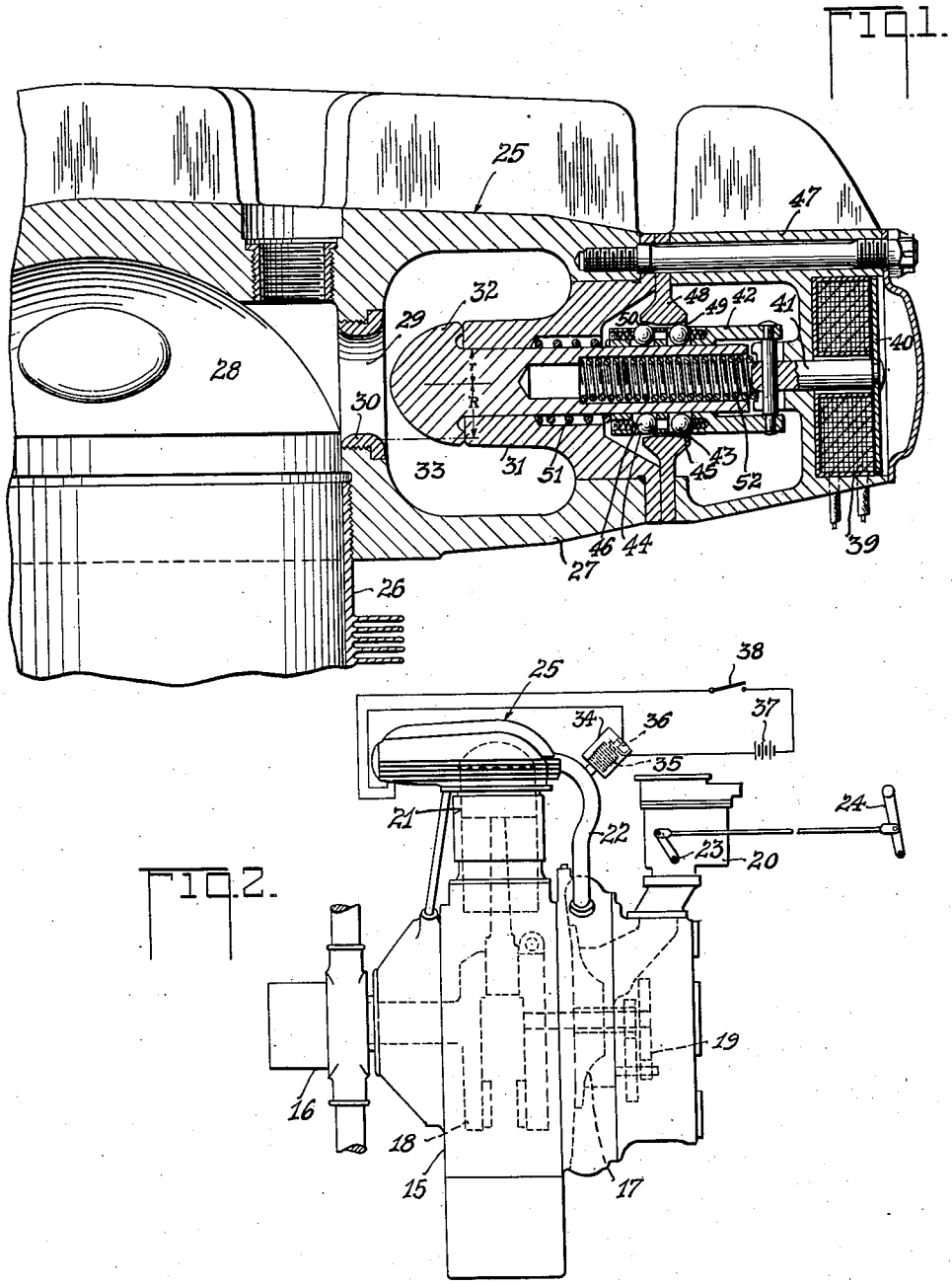
INVENTOR.
ANDRÉ J. MEYER
BY
ATTORNEY.

June 14, 1938.  A. J. MEYER  2,120,290
ADJUSTABLE CONBUSTION CHAMBER ENGINE
Filed April 21, 1937  2 Sheets-Sheet 2

INVENTOR.
ANDRÉ J. MEYER
BY
ATTORNEY.

Patented June 14, 1938

2,120,290

UNITED STATES PATENT OFFICE 2,120,290

ADJUSTABLE COMBUSTION CHAMBER ENGINE

Andre J. Meyer, Lexington, Ky., assignor to The Reed Propeller Co., Inc., a corporation of New York Application April 21, 1937, Serial No. 138,089

6 Claims. (Cl. 123—48)

This invention relates to aircraft internal combustion engines and is particularly concerned with an adjustable combustion chamber engine to provide a variable compression ratio and a new mode of operating an aircraft equipped with such an engine.

With an engine having limitations as to structural strength and characteristics of heat dissipation, the power which may be taken from the engine is limited by the speed at which the engine is operated, the maximum pressure within the engine cylinders and the compression ratio. In the case of aircraft engines, low fuel consumption is desired which guides the designer toward the use of a compression ratio limited principally by the detonation tendency of the fuel used. Under the part-power running condition encountered in cruising flight of an aircraft, a high compression engine gives adequate power with low fuel consumption and without excessive cylinder pressures. However, under take-off conditions of the aircraft, more power is needed than in cruising flight, but since the engine structure limits the cylinder pressures which can be used, the engine must be operated with limited manifold pressure in order that the cylinder pressure will not be excessive.

It is well known that an engine having low compression ratio may be operated with a high manifold pressure to produce increased power with a sacrifice in fuel economy. With such an engine, the cylinder pressure will be no greater than with a high compression ratio and accordingly, the engine structure is stressed to no greater extent that in the case of the high compression ratio. In fact, experiments indicate that the engine stresses and the temperatures encountered may be more favorable with the low compression, highly supercharged engine than with the high compression engine having limited supercharge. Such a low compression engine produces greater power with poorer fuel economy than the corresponding high compression engine. Current practice in high compression engine operation is to use an excessively rich mixture during take-off to suppress detonation but, still, the cylinder pressures developed are inclined to be excessive without the desired gain in power.

It is an object of this invention to provide suitable structure for an aircraft engine whereby two compression ratios are available, the high ratio being utilized in normal flight (part-power) and the low ratio being used for take-off when high power is wanted.

A further object of the invention is to provide a novel method of operating an aircraft engine, utilizing a plurality of available compression ratios. Still another object of the invention is to provide means for automatically altering the compression ratio of the engine in accordance with the power demand thereon. A further object of the invention is to coordinate the method and structure hereinafter described in detail, with means for supercharging the fuel charge entering the engine.

The invention may be understood in detail by reading the annexed specification in connection with the drawings, in which:

Fig. 1 is a section through the cylinder head of an internal combustion engine, showing the structure which makes available a plurality of compression ratios.

Fig. 2 is a side elevation of an aircraft power plant incorporating the structure of the invention.

It is well known that for any engine the power output at a given speed depends primarily upon the manifold pressure and the compression ratio, and that the power output of the engine increases with increments in compression ratio or with increments in manifold pressure. However, if the octane rating (anti-detonating capacity) of the fuel and the compression ratio are fixed, the manifold pressure in the engine can only be increased up to the point where the detonation begins. With supercharged engines, the manifold pressure can be changed virtually at will, and it is obvious that in an engine supercharged to maintain maximum manifold pressure at altitude with full throttle operation, the throttle must be partly closed at ground level so that cylinder pressure will not build up beyond the point of detonation, due to greater air density at ground level.

When the compression ratio is lowered a higher manifold pressure may be used. In other words, if a low compression ratio is available at ground level, the engine throttle could be opened fully. Experiments have shown that the loss in power output due to the use of a low compression ratio will be much more than offset by the power resulting from the higher manifold pressure that can then be safely used. The penalty for obtaining this greater power at ground level is increased fuel consumption (due to the low compression ratio) but this is immaterial for short periods of take-off, so long as economical operation can be maintained with a higher compression ratio during normal flight.

In the subsequent description, it is assumed that engine speed is constant, which is a proper assumption in current aircraft engine practice, due to the use of constant speed governors in conjunction with controllable pitch propellers.

Figure 3:
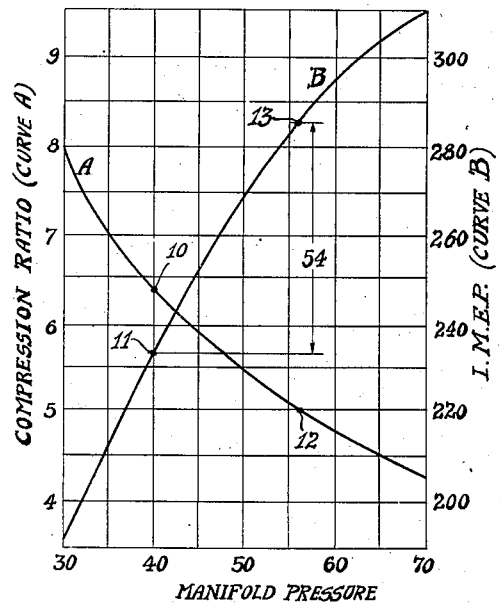
Fig. 3 is a graph showing changes in compression ratio and indicated mean effective pressure with respect to manifold pressure in a typical engine.

Referring to Fig. 3, curve (A) shows a range of maximum permissible compression ratios as limited by detonation, according to variations in manifold pressure in the engine. Curve (B) shows the power output which may be expected in terms of indicated mean effective pressure, if the conditions of curve (A) are satisfied. These curves correspond approximately to conditions of design which are in harmony with an existing type of high performance aircraft engine. Assuming 40 inches of mercury manifold pressure in the engine having 6.4 compression ratio as indicated at 10 in Fig. 3, the indicated mean effective pressure becomes approximately 233 pounds per square inch, as shown at 11. It is apparent that if the manifold pressure is raised to 57 inches of mercury, the limiting compression ratio will be 5.0, as shown at 12, but the indicated mean effective pressure will increase to 287, as shown at 13, giving a net increase of 54 pounds per square inch indicated mean effective pressure over that which was obtainable with the high compression ratio.

Figure 4:
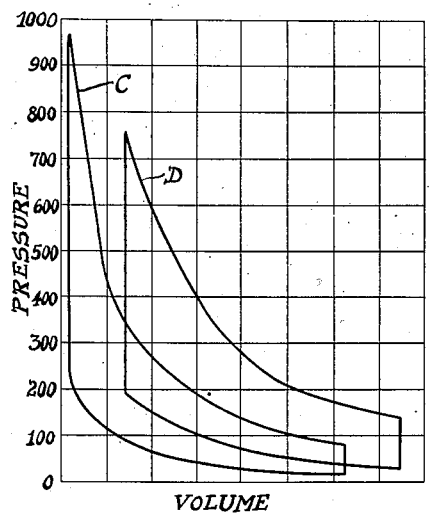
Fig. 4 is a pressure-volume diagram for different compression ratios in a typical engine.

Conventional engines today are compromised in their compression ratio so as to give the best fuel consumption obtainable together with good take-off power. If this compromise were not mandatory, a higher compression ratio could be used for normal flight, while a much lower compression ratio with high supercharge could be used to obtain greater power for take-off. Accordingly, an improvement in overall fuel economy can be obtained simultaneously with an increase in take-off power, if at least two compression ratios are made available. One ratio can be selected to ideally fit moderate cruising power conditions, while the other can be chosen for maximum power output without respect to fuel consumption. Fig. 4 shows the theoretical indicator cards for two different compression ratios in an engine, the highest possible manifold pressure being utilized in each case. The curve (C) represents the indicator card for an engine of high compression ratio while curve (D) represents a card for low compression ratio. The former gives optimum economy while the latter maximum power, the area in the respective cards indicating the power which is produced. The change in available power and in fuel economy in accordance with the curves (C) and (D) is generally similar to the power curves available from steam engines at respectively short cut-off and long cut-off. In steam engine practice the short cut-off limits power output, but gives high economy, as for instance for running conditions, while the long cut-off allows for increased M. E. P. with a sacrifice of economy.

Reference may now be made to Fig. 2 which shows, diagrammatically, an air cooled radial internal combustion engine 15 provided with a controllable pitch constant speed propeller 16 and with a supercharger 17 driven from the engine crankshaft 18 by step-up gearing 19. The supercharger 17 receives the fuel mixture from a carburetor 20, delivering the fuel charge under pressure to the engine cylinder 21 through a manifold 22. Control of the mixture supply to the engine is effected by the conventional throttle 23 operated by a throttle lever 24. The cylinder or cylinders of the engine are provided with a special type of head 25, shown in detail in Fig. 1. The head 25 is provided with a hollow extension 27 communicating with the clearance space 28 above the piston through a port 29 having a screwed-in valve seat 30. A guide 31 is fitted to the outer end of the extension 27 to provide a closure therefor and also carries a valve 32 axially movable to seat or unseat with respect to the port 29. The extension and guide together define an auxiliary clearance space 33 and when the valve 32 is open, the normal clearance space 28 and the auxiliary clearance space 33 combine to form an augmented clearance space, whereby the compression ratio of the engine is lowered. When the valve 32 is shut the clearance space 28 alone is operative whereby the engine compression ratio is increased.

I provide an automatic means, responsive to fuel charge pressure in the manifold 22 to open and close the valve 32 in accordance with engine operating conditions. These means comprise a housing 34 containing an expansible bellows 35 connected to the manifold 22 and carrying an electrical switch 36 connected in series with a power source 37, a master switch 38, and a solenoid 39, the latter shown in Fig. 1. Preferably the housing 34 is sealed to contain a fixed volume of air or gas so that the expansion of the bellows 35 is responsive to changes in absolute manifold pressure. If the housing 34 were vented to the atmosphere, operation of the bellows would be responsive to the pressure difference between manifold pressure and atmospheric pressure. The shifting of the engine from high compression to low compression is divorced from altitude effects if the housing 34 is sealed, so that the compression ratio shift is responsive to the absolute pressure within the engine cylinder. When the manifold pressure increases to a certain point, the switch 36 is closed energizing the solenoid 39. When the manifold pressure is below the critical value, the circuit is opened and the solenoid 39 is inactive. Referring now to Fig. 1, an armature 40 is arranged to be acted upon by the solenoid 39, this armature being connected through a rod 41 to a cage 42 having axially spaced sets of recesses 43 and 44 within each of which a row of balls 45 and 46 is engaged. Between the guide 31 and a housing 47 which carries the solenoid, is an annular member 48 provided with a bore tapered at its ends as at 49 and 50. The balls 45 and 46 are arranged to make contact with the stem of the valve 32 and with the surfaces of respective tapered bores.

When the armature 40 is drawn to the left by the solenoid, the cage 42 is likewise drawn to the left, whereby the balls 45 jam between the valve stem and the member 48 as a one-way clutch. If the valve 32 be then moved to the right by pressure within the engine cylinder, the valve disengages the seat 30 and permits of communication between the spaces 28 and 33, the valve being held open by the clutch action of the balls. When the solenoid 39 is de-energized a spring 51 acting between the cage and the housing 47 moves the cage to the right to disengage the balls 45, and to jam the balls 46 between the valve stem and the member 48. Thereupon the valve 32 is moved to the left under the influence of a spring 52 and will gradually approach the seat 30 at those intervals in the cyclic operation of the engine when the pressure in the cylinder is lowered such as during the exhaust and intake strokes, the balls 46 holding the valve closed by their clutch action. With the valve 32 thus seated, the high compression ratio is made available in the engine.

It may here be pointed out that the spring 52 should exert a force somewhere between the minimum and the maximum load on the valve due to varying pressure occurring in the cylinder.

As the valve approaches its closing position, probably during several cycles of engine operation, there will be a leakage through the space between the valve seat 30 and the valve 32. There will likewise be a balancing effect on the valve due to the action of high pressure within the space 33 acting upon the annulus in the rear of the valve head represented by the difference between R and r. With high pressure in the space 33 and low pressure in the space 28, the balancing pressure will tend to augment the action of the spring 52 for closing the valve, but as the valve approaches its fully closed position, the pressure in the space 33 will approach the average pressure obtaining within the cylinder head. At such time as the low compression ratio is desired, when the solenoid 39 is energized, the high pressure of combustion within the space 28 will quickly open the valve 32 against the action of the spring 52 and the lower pressure which has dwelt in the space 33.

It is within the purview of the invention, as limited by the annexed claims, to provide any form of variable compression mechanism which may be deemed desirable, although that form which is shown and described in detail above provides a practical organization.

The combination of elements above described makes possible a novel mode of operation of an aircraft power plant. Ordinarily, when the engine is started prior to take-off, the pressure in the manifold 22 is low, whereby the circuit of the solenoid 39 is inactive and the engine is adjusted for high compression ratio. During the take-off maneuver the throttle 23 is opened wide causing a high pressure in the manifold 22, as the engine increases its speed to normal, causing closure of the switch 36 and readjustment of the engine to the low compression ratio. With the engine in low compression ratio condition, relatively high manifold pressures will be used whereby the power output is substantially increased as previously outlined, affording improved take-off performance of the airplane. Shortly after take-off the pilot partly closes the throttle 23 for cruising conditions, whereupon, by the reduced pressure in the manifold 22, the engine is readjusted to high compression ratio whereat optimum economy for the desired power is made available. Should the aircraft pilot require maximum available power during low altitude operation, he may open the throttle 23 wide, whereupon the engine is readjusted to low compression operation with consequent high manifold pressure capability and power increase and decrease in economy which latter is not undesirable where maximum power is required.

Under conditions of high altitude operation, where the atmospheric pressure is low, operation of the engine under full throttle conditions may not necessarily effect a change in compression ratio, but this is immaterial since maximum possible engine power at altitude will be safe with the high compression ratio.

I have shown an automatic means, responsive to absolute manifold pressure, for effecting changes in engine compression ratio and although I consider such an automatic arrangement preferable, its use is not mandatory. It is feasible to leave the changing of compression ratio to the option of the pilot or possibly to provide for automatic change in compression ratio in response to some other factor than manifold pressure.

While I have described my invention in detail in its present preferred embodiment, it will be obvious to those skilled in the art, after understanding my invention, that various changes and modifications may be made therein without departing from the spirit or scope thereof. I aim in the appended claims to cover all such modifications and changes.

What I claim is:

1. In a cylinder head having a port, a closed hollow extension thereon, the hollow communicating with the cylinder head through said port, valve means movable to open and close said port, said valve means having a stem, means urging said valve toward a port closing position, selectively operable, opposed, one-way clutches for holding said valve in port opening or port closing positions.

2. In a cylinder head having a port, a closed hollow extension thereon, the hollow communicating with the cylinder head through said port, valve means movable to open and close said port, said valve means having a stem, means urging said valve toward a port closing position, selectively operable, opposed, one-way clutches for holding said valve in port opening or port closing positions, said clutches comprising a plurality of balls disposed around the valve stem, tapered annular abutments embracing the balls, and a ball cage axially shiftable along the valve stem to engage and disengage the balls relative to the abutments.

3. In a cylinder head having a port, a closed hollow extension thereon, the hollow communicating with the cylinder head through said port, valve means movable to open and close said port, said valve means having a stem, means urging said valve toward a port closing position, selectively operable, opposed, one-way clutches for holding said valve in port opening or port closing positions, said clutches comprising a plurality of balls disposed around the valve stem, tapered annular abutments embracing the balls, a ball cage axially shiftable along the valve stem to engage and disengage the balls relative to the abutments, and electromagnetic means for shifting said ball cage.

4. In a cylinder head, a main combustion chamber, an auxiliary combustion chamber communicating therewith, valve means movable to establish and to cut off communication between said chambers, and opposed selectively operable one-way clutches acting on said valve means for holding same in position for communication and separation of said chambers.

5. In a cylinder head, means movable to increase and decrease the clearance volume thereof, and selectively operable opposed one-way clutches for holding said movable means in position for large and small cylinder clearance volume.

6. In an engine cylinder head, means movable to increase and decrease the clearance volume thereof, and selectively operable irreversible mechanism for holding said means in position for either large or small clearance volume against the action of the gas pressure within the cylinder.

ANDRE J. MEYER.